(12) United States Patent
Staniulis, Jr.

(10) Patent No.: US 11,073,335 B1
(45) Date of Patent: Jul. 27, 2021

(54) COOLING TOWER INTEGRATED WITH A MODIFIED SWAMP COOLER

(71) Applicant: Anthony Staniulis, Jr., Las Vegas, NV (US)

(72) Inventor: Anthony Staniulis, Jr., Las Vegas, NV (US)

( * ) Notice: Subject to any disclaimer, the term of this patent is extended or adjusted under 35 U.S.C. 154(b) by 0 days.

(21) Appl. No.: 16/847,655

(22) Filed: Apr. 13, 2020

(51) Int. Cl.
*F28C 1/14* (2006.01)

(52) U.S. Cl.
CPC ..................................... *F28C 1/14* (2013.01)

(58) Field of Classification Search
CPC . F25B 2339/021; F25B 5/0035; F24F 5/0035; F28C 1/14
See application file for complete search history.

(56) References Cited

U.S. PATENT DOCUMENTS

| | | | | |
|---|---|---|---|---|
| 4,031,180 A * | 6/1977 | Bohanon | ................... | F24F 6/04 261/106 |
| 4,968,457 A * | 11/1990 | Welch | ................... | F24F 5/0035 236/44 A |
| 5,555,742 A * | 9/1996 | Kelley | ................ | B01D 50/006 62/311 |
| 6,367,277 B1 * | 4/2002 | Kinkel | .................. | F24F 5/0035 62/310 |
| 2010/0064718 A1 * | 3/2010 | Blomquist | ................ | F28F 3/12 62/401 |
| 2010/0194105 A1 * | 8/2010 | Paquet | ................ | F24F 13/0272 285/330 |
| 2017/0219410 A1 * | 8/2017 | Thomas | ................... | F24F 11/83 |

* cited by examiner

*Primary Examiner* — David J Teitelbaum
(74) *Attorney, Agent, or Firm* — Bayramoglu Law Offices LLC

(57) ABSTRACT

Evaporative cooling system including a cooling tower attached to a modified swamp cooler. The modified swamp cooler comprising a fan, a fan housing and at least one air outlet located in a bottom of the modified swamp cooler. The cooling tower comprises at least one indirect heat exchanger and all inner surfaces of the cooling tower, except for the at least one indirect heat exchanger, are made from and/or comprise a non-porous material. The non-porous material is high-density polyethylene. The cooling tower attached to the modified swamp cooler is part of an evaporative cooling system and supplies cool air to a building or areas which desire cooling.

19 Claims, 16 Drawing Sheets

COOLING TOWER INTEGRATED WITH A MODIFIED SWAMP COOLER

TECHNICAL FIELD

The present disclosure relates to a cooling tower including an evaporative cooler attached to a modified swamp cooler. More specifically, the present disclosure has a cooling tower attached to one side of a modified swamp cooler, where the modified swamp cooler is devoid of heat exchangers and the internal surfaces of the cooling tower are made from a non-porous material and/or comprise a non-porous material.

BACKGROUND

Swamp coolers are known in the art as evaporative coolers.

Evaporative coolers provide cool air by converting hot dry air through an evaporative process. This evaporative process works by forcing warm air through fluidly moist heat exchange pads to remove the hot dry air's heat and then injects cooled moist air into a desired space.

Evaporative cooling cools air by evaporating water which increases the moisture content of the air. One goal of the evaporative cooling system is to have the supply air temperature leaving the evaporative cooler approach the outdoor wet-bulb temperature. Evaporative cooling systems are suitable for hot and dry climates where the design wet-bulb temperature is 68° F. or lower. In other climates, outdoor humidity levels are too high to allow for sufficient cooling.

However, swamp coolers have many disadvantages and problems such as quickly forming mold, mildew, having calcination and forming deposits of metals and/or minerals, due to the water being evaporated, on all metal and/or non-porous internal surfaces of the swamp cooler since water, including hard water, being distributed through metal or plastic tubing, contacting all internal surfaces of the swamp cooler via evaporation and standing water and through metal heat exchanger pads. Due to the mold and mildew problems of the swamp cooler, a swampy smell and associated problems with air quality is introduced into the building, house or other enclosed area to which the cooled air is to be introduced. These deposits of mold, mildew, calcination, metals and minerals reduce the cooling efficiency of the swamp cooler and reduces the useful life of the swamp cooler overtime since the formations of mold, mildew, calcination, metals and minerals onto the inner surfaces of the swamp cooler reduce the effective cooling passage flow areas within the heat exchangers and form a thermal barrier layer within the cooling passages of the heat exchangers and therefore reduces the cooling efficiency of the heat exchangers and further increases the operational cost of the swamp cooler by having to input more electrical energy such as more power to the fan(s) and pump(s) in order to run the fan(s) and pumps(s) at higher speeds to compensate for the reduced cooling efficiency caused by the buildup of mold, mildew, calcination and deposits of metals and minerals onto the inner surface of the swamp cooler. Furthermore, frequent cleaning is required on conventional swamp coolers to avoid these problems which significantly increase the operating costs to the owner of the swamp cooler as well as creating frequent hazardous preventive maintenance due to most swamp coolers being positioned/mounted on the roof of a building which may even make maintenance and cleaning impossible in certain weather events and conditions.

Therefore, there is a need to provide an energy saving, efficient, low cost and low maintenance evaporative cooling system.

Applicant has solved the above problems by attaching a cooling tower which includes an evaporative cooler to at least one side a modified swamp cooler.

The present disclosure and invention has solved the problem of preventing mold, mildew, calcination and deposits of metals and minerals forming on the inner surface of the swamp cooler by not having heat exchangers nor fluid spraying, pumping and measuring devices and apparatus located within the swamp cooler but by rather having all evaporating heat exchangers and fluid spraying, pumping and measuring devices and apparatus located within the cooling tower and by having all inside surfaces of the cooling tower, except for the surfaces of the indirect heat exchanger pads, made from and/or comprise a non-porous material such as high-density polyethylene (HDPE) and not made from metal. If desired, only a portion or portions of the inside surface or surfaces of the cooling tower, except for the surfaces of the indirect heat exchanger pads, is/are made from and/or comprise a non-porous material such as high-density polyethylene (HDPE) and not made from metal. However, it is best and preferred if all inside surfaces of the cooling tower, except for the surfaces of the indirect heat exchanger pads, are made from and/or comprise a non-porous material such as high-density polyethylene (HDPE) and not made from metal. Therefore, the present disclosure includes all inside surfaces of the cooling tower, except for the surfaces of the indirect heat exchanger pads, made from and/or comprise a non-porous material such as high-density polyethylene (HDPE) which prevents the formation of mold, mildew, calcination and deposits of metals and minerals on the inner surfaces of the cooling tower and therefore increases the cooling efficiency and the operational life of the cooling tower and the evaporative cooling system as well as lowers the cost of operating the cooling tower and evaporative cooling system by reducing the consumption of power to run the pump(s), fan(s) and other system components and by eliminating frequent cleaning and maintenance.

SUMMARY

The present disclosure describes a cooling tower, which includes an evaporative cooler, attached to at least one side a modified swamp cooler. The modified swamp cooler does not have heat exchangers nor fluid spraying, pumping and measuring devices and apparatus located within the swamp cooler. The modified swamp cooler does have a fan located therein. However, all surfaces of the fan are coated and/or made from a non-porous material such as high-density polyethylene (HDPE) which prevents the formation of mold, mildew, calcination and deposits of metals and minerals from forming on the surfaces of the fan. The non-porous surfaces can be made by known methods of manufacturing as well as molding, coating or 3-D printing.

All inside surfaces, except for the surfaces of the indirect heat exchanger pads, of the cooling tower, are made from a non-porous material and not made from metal. The non-porous surfaces can be made by known methods of manufacturing as well as molding, coating or 3-D printing. Preferably, all inside surfaces of the cooling tower, except for the surfaces of the indirect heat exchanger pads, are made from and/or comprise high-density polyethylene (HDPE) in order to solve the problem of mold, mildew, calcination and deposits of metals forming on the inner surface of the cooling tower because if all inside surfaces of the cooling tower, except for the surfaces of the indirect heat exchanger pads, are made from and/or comprise HDPE then mold, mildew, calcination and deposits of metals including alkaline earth metals and/or other metals are prevented from forming on the inner surfaces of the cooling tower and this prevention of mold, mildew, calcination and deposits of metals increases the cooling efficiency during the operational life of the cooling tower and the evaporative cooling system.

High-density polyethylene (HDPE) or polyethylene high-density (PEHD) is a thermoplastic polymer produced from the monomer ethylene. One example of HPDE which is used is a Marine Grade HDPE such as SEABOARD™ or STARBOARD™ made by Ridout Plastics Co. Inc. The Marine Grade HDPE can be the color of polar white or any other known color. The Marine grade HDPE has superior scratch and impact resistance, high stiffness, is ultraviolet (UV) stabilized, will not delaminate, chip, rot, or swell, is easy to machine with standard tooling, is a low energy material and has no moisture absorption, is easy to clean and is FDA and USDA approved with UV additive. The thickness used on all surfaces of the cooling tower of the Marine Grade HDPE is in the range of one sixteenth of an inch to six inches. The above characteristics and benefits are needed and required to make the disclosed cooling tower prevent the formation of mold, mildew, calcination and deposits of metals, prevent thermal warping and increase the cooling efficiency during the operational life of the cooling tower and the evaporative cooling system.

Polyesters are formed by polyalkylene terephthalates having alkyl groups or radicals comprising 2 to 10 carbon atoms and polyalkylene terephthalates having alkyl groups or radicals containing 2 to 10 carbon atoms which are interrupted by 1 or 2 —O—. Further, polyesters can be polyalkylene terephthalates having 5 alkyl groups or radicals containing 2 to 4 carbon atoms.

Examples of polyolefin materials are polyethylenes (PE) which include high density polyethylene (HDPE) having a density greater than 0.944 g/cm$^3$, medium density polyethylene (HDPE) having a density in the range of 0.926 g/cm$^3$ to 0.940 g/cm$^3$, low density polyethylene (LDPE) having a density in the range of 0.910 g/cm$^3$ to 0.925 g/cm$^3$, in the form of nonoriented sheets (PE sheet) or monoaxially or biaxially oriented sheets (oPE sheet), polypropylenes (PP), such as axially or biaxially oriented polypropylene (oPP sheet) or cast polypropylene (cPP sheet), amorphous or crystalline polypropylene or blends thereof or atactic or isotactic polypropylene or blends thereof, poly(1-butene), poly(3-methylbutene), poly(4 methylpentene) and copolymers thereof, then polyethylene with vinyl acetate, vinyl alcohol or acrylic acid, such as, for example, ionomer resins, such as copolymers of ethylene, of acrylic acid, of methacrylic acid, of acrylic esters, tetrafluoroethylene or polypropylene, in addition random copolymers, block copolymers or olefin polymer/elastomer blends. The polyolefin materials can also comprise cycloolefins as monomer of a homopolymer or of copolymers.

The disclosed invention uses on all inside surfaces of the cooling tower, except for the surfaces of the indirect heat exchanger pads, high-density polyethylenes. However, polypropylenes and ionomers having the density of the range of HPDE, may be used on all inside surfaces of the cooling tower, except for the surfaces of the indirect heat exchanger pads. If desired, only a portion or portions of the inside surface or surfaces of the cooling tower, except for the surfaces of the indirect heat exchanger pads, is/are made from and/or comprise a non-porous material such as high-density polyethylene (HDPE). However, it is best and preferred if all inside surfaces of the cooling tower, except for the surfaces of the indirect heat exchanger pads, are made from and/or comprise a non-porous material such as high-density polyethylene (HDPE) and not made from metal.

Examples of polyamides (PA) for the plastics sheets are composed, for example, of polyamide 6, ε-caprolactam homopolymer (polycaprolactam); polyamide 11; polyamide 12, ω-lauryllactam homopolymer (polylauryllactam); polyamide 6,6, homopolycondensate of hexamethylenediamine and of adipic acid (poly(hexamethylene adipamide)); polyamide 6,10, homopolycondensate of hexamethylenediamine and of sebacic acid (poly(hexamethylene sebacamide)); polyamide 6,12, homopolycondensate of hexamethylenediamine and of dodecanedioic acid (poly(hexamethylene dodecanamide)) or polyamide 6-3-T, homopolycondensate of trimethylhexamethylenediamine and of terephthalic acid (poly(trimethylhexamethylene terephthalamide)), and blends thereof. The polyamide sheets are drawn monoaxially or biaxially (oPA).

One of many benefits of HDPE is from HDPE's inherent malleability such as being meltable and moldable as well as being a low-cost material. HDPE has a high melting point which is in the range of 239° F.-275° F. and therefore, HDPE remains rigid at very high temperatures. However, once HDPE reaches its melting point, the HDPE material can be quickly and efficiently molded for use. Moreover, HDPE can be shaped and/or made into any desired geometric or polygonal shape by using, for example, a 3-D printer.

Additionally, HDPE is corrosion resistance. HDPE resists mold, mildew and rotting, making HDPE the ideal material for being used in cooling towers which are exposed to water due to the HDPE resisting mold and mildew which results in low maintenance and very low frequent cleaning of the cooling tower as compared to conventional cooling towers. HDPE is long-lasting and weather-resistant and can be sterilized by boiling. Additionally, HDPE can withstand most strong mineral acids and bases and has excellent resistance to naturally occurring chemicals. Moreover, the material of HDPE is non-porous and virtually impervious to most common chemicals, water, solvents, acids, detergents, and cleaning fluids. Therefore, calcination and metals from water are prevented from forming on the surface of HDPE.

HDPE has a large strength to density ratio. HDPE's linear structure means the material has little branching, which offers HDPE stronger intermolecular forces and tensile strength than MDPE and LDPE. HDPE plastic is easily recyclable and therefore reduces non-biodegradable waste from being introduced into landfills and helps reduce plastic production.

One example of an evaporative cooler and system is disclosed below.

A cooling tower, which includes an evaporative cooler, is attached to at least one side a modified swamp cooler. The cooling tower comprises at least one indirect heat exchanger pad. The at least one indirect heat exchanger pad comprises a plurality of heat exchanger passages where ambient hot air passes through the plurality of heat exchanger passages by a fan located within a modified swamp cooler. Within the cooling tower, a fluid from above the at least one indirect heat exchanger pad flows down and over the surfaces of the at least one indirect heat exchanger pad, including the plurality of heat exchanger passages, and makes direct contact with the ambient hot air. Therefore, the ambient hot air has now being cooled and moistened. The now cooled ambient or outside air then flows through at least one outlet of the cooling tower and into the modified swamp cooler where this cooled ambient air exits the modified swamp cooler through at least one outlet located in a bottom or bottom portion of the modified swamp cooler.

The fan in the modified swamp cooler is a motorized impeller variable frequency drive (VFD) fan. Therefore, the outside air is pulled through the at least one indirect heat exchanger pad from outside of the cooling tower to inside the cooling tower and then into the modified swamp cooler using the motorized impeller variable frequency drive (VFD) fan.

The at least one indirect heat exchanger pad is located on either a left side, a right side or on both sides of the cooling tower and cooled ambient air flows out of at least one air outlet. The air outlet is formed on the cooling towers left side or right side. Therefore, there is no air outlet in the top/roof of the cooling tower.

Additionally, any ambient air inlet can comprise louvers and/or movable supports such that the air inlet can be moved using wheels in order to perform maintenance and such that the air inlet can be closed to the ambient environment to protect the cooling tower from unwanted environmental debris and conditions such as dust, wind and thunderstorms.

The fluid, which has now flowed through the plurality of heat exchanger passages of the at least one indirect heat exchanger pad, exits the plurality of heat exchanger passages and is collected in a bottom portion of the cooling tower. The bottom portion of the cooling tower has a slanted or curved shape which enables the collected fluid exiting the at least one indirect heat exchanger pad to flow to a middle section of the bottom portion of the cooling tower where the collected fluid flows through an opening in the middle section where this collected fluid is pumped via a circulating pump or pumps to at least one of the indirect heat exchanger pads.

A plurality of conduit apertures is located within a bottom of a conduit (i.e. a sump wash down pipe/conduit), where the conduit is located above the bottom portion of the cooling tower so as to provide automatic cleaning of the cooling tower.

A drain is attached to the bottom portion of the cooling tower and is in fluid connection with the collected fluid in order to remove and/or drain the collected fluid from the bottom portion of the cooling tower at any desired time.

A dump or drain valve and a filter are fluidly connected to the opening in the middle section and is located upstream from the circulating pump or pumps in order to remove dirt or sediment from the collected fluid which has flowed through the opening in the middle section of the bottom portion of the cooling tower. The filter can be a Y-strainer type filter or any type of known filter. The type of values used can be any known type of valve.

A door panel is located on one side and/or on a bottom of the cooling tower in order to easily access the circulating pump or pumps and/or any other apparatus.

The circulating pump(s) is/are a seal less magnetically drive pump and also is a variable frequency drive (VFD) pump. The circulating pump(s) can operate in the range of one to three amps which dramatically reduces operating costs and still meets the cooling systems load requirement. All of the inner surfaces of the fluid passages through which the collected fluid flows through the circulating pump(s) are not metal in order to solve the problem of calcium, alkaline earth metals and/or other metals forming on the surface of the fluid passages. Therefore, all of the inner surfaces of the fluid passages in the circulating pump which the collected fluid flows through are made of a non-porous material such as high-density polyethylene (HDPE) because HDPE resists mold, mildew and well as prevents calcination and the formation of metal deposits. However, the circulating pumps can be any pump which has inner surfaces of the fluid passages in the circulating pump being made of a non-porous material such as high-density polyethylene (HDPE).

Since the fan is a variable frequency drive (VFD) fan and the circulating pump(s) is/are a variable frequency drive (VFD) pump, the fan and the circulating pump(s) can be operated in conjunction with each other and at low speeds and low amperage in order to satisfy the requirements of the cooling capacity given an outside air temperature in order to increase the cooling towers and cooling systems efficiency because operating the fan(s) and/or the circulating pump(s) at low speeds lowers air velocity and fluid pump flow and therefore increases the time (i.e. dwell time) the air and fluid are within the at least one indirect heat exchanger pad which increases the heat transfer effectiveness significantly while reducing the electric power to the fan(s) and/or the circulating pump(s).

Additionally, the present invention attaches non-porous boards on the front and back sides of the at least one indirect heat exchanger pad at both the upper and lower ends of the at least one indirect heat exchanger pad. Non-porous supports are attached to walls of the cooling tower such that the non-porous boards, which are attached at the lower ends of the at least one indirect heat exchanger pad, are supported by the non-porous supports. For example, the non-porous supports have a groove and the non-porous boards are located within the grooves of the supports such that a space is formed between the bottom surface of the at least one indirect heat exchanger pad and the bottom portion of the cooling tower. The non-porous boards are removably fastened to the at least one indirect heat exchanger pad for the purpose of being able to easily remove the at least one indirect heat exchanger pad from the cooling tower in order to perform cleaning and/or maintenance or to replace the at least one indirect heat exchanger pad. The non-porous supports and non-porous boards are made from and/or comprise high-density polyethylene. Furthermore, the non-porous boards can be rectangular shaped, any other geometrical or polygonal shape and/or can have any aerodynamic shape in order create a smooth or laminar flow to any air contacting the non-porous boards.

Additionally, a lower supporting apparatus is attached to the surface of the at least one indirect heat exchanger pad which solves the problem of preventing the fluid which has flowed over the surfaces of the at least one indirect heat exchanger pad from splashing or flowing out from the cooling tower, which reduces the loss and use of water in the cooling system. The lower supporting apparatus comprises a non-porous backboard and a non-porous drain board, where the non-porous drain board makes an angle in the range of five to twenty-two degrees with a horizontal line (i.e. a flat/non-vertical line such as the x-axis in the conventional x-y coordinate system).

A filter or grate is attached to an outer surface of the cooling tower. A distance between an inner surface of the filter or grate and a surface of the at least one indirect heat exchanger pad is in the range of 4.0 to 6.0 inches, 4.5 to 5.5 inches, 4.8 to 5.2 inches, or 4.9 to 5.1 inches. The distance between the inner surface of the filter or grate is critical because the distance solves two interconnected problems. First, the distance solves the prevention of calcination or the prevention of other metals collecting on the surface of the at least one indirect heat exchanger pad by having ambient or outside side flowing uniformly (i.e. the second solved problem) through the entire surface area of the at least one indirect heat exchanger pad.

At a top portion of the at least one indirect heat exchanger pad, a distribution apparatus is positioned above the top portion of the at least one indirect heat exchanger pad and a fluid line is fluidly connected to and pressurized by the circulating pump. The fluid line is fluidly connected to the distribution apparatus from inside the cooling tower, so the fluid is not in direct contact with the sun and is prevented from being heated by the direct rays or other hot elements from outside of the cooling tower. The distribution apparatus can have an open bottom and a distribution plate fastened to the distribution apparatus which has a plurality of holes and the plurality of holes are arranged in a staggered arrangement or random arrangement so as to evenly allow the pressurized fluid to flow through the plurality of holes onto the outer surface of the at least one indirect heat exchanger pad. However, the distribution apparatus can have a bottom surface comprising a plurality of holes therein, which allows for not having a distribution plate, and the plurality of holes are arranged in a staggered arrangement or random arrangement so as to evenly allow the pressurized fluid to flow through the plurality of holes onto the outer surface of the at least one indirect heat exchanger pad. The distribution apparatus is in the same shape as the top portion of the at least one indirect heat exchanger pad in order to fully coat all surfaces of the at least one indirect heat exchanger pad with a fluid. Therefore, the distribution apparatus is in the general shape of a rectangle where the sides and top of the distribution apparatus form a fluid tight apparatus and the bottom of the distribution apparatus allows a fluid to pass therethrough. At least one side of the distribution apparatus has a fluid inlet for the fluid pumped via the circulating pump(s) to enter the distribution apparatus. Therefore, the top and all sides of the distribution apparatus, except for the portion of the side which has the fluid inlet, do not allow passage of a fluid (i.e. are closed to atmospheric air).

By having the fluid being introduced into the distribution apparatus under pressure (i.e. more than atmospheric pressure) by the circulating pump, as opposed to having the fluid operating under atmospheric pressure solves the problem of being able to either increase or decrease the flow rate over the outer surfaces of the at least one indirect heat exchanger pad. Furthermore, since the fluid is pressurized by the circulating pump(s), this has allowed Applicant to create hole sizes within the distribution apparatus such that the fluid level within the distribution apparatus stays at a constant level and/or maintains a level such that the outer surfaces of the at least one indirect heat exchanger pad is always fully coated or saturated during use. The holes can be round, circular or any geometric or polygon shape. The size of the holes can have a diameter of one sixteenth of an inch to four inches. However, the hole diameters can be smaller and/or larger than one sixteenth of an inch or four inches. If the opening of the holes is not circular in shape, then the holes opening can be one sixteenth of an inch to four inches or can be larger or smaller than one sixteenth of an inch or four inches. The holes may all have the same size or may have different sizes in order to create hole sizes within the distribution apparatus such that the fluid level within the distribution apparatus stays at a constant level and/or maintains a level such that the outer surfaces of the at least one indirect heat exchanger pad is always fully coated or saturated during use.

An ultrasonic sensor and relay are located above the bottom portion of the cooling tower, attached to a non-porous device and are inserted within a protective container. The ultrasonic sensor and relay senses and determines the collect fluid level within the bottom portion of the cooling tower and send signals to a relay in the cooling system and to a fill valve, which is fluidly connected to the distribution apparatus. The ultrasonic sensor and relay send signals to the fill valve and/or chilled water valve such that the fill valve and/or chilled water valve operates such in a manner to add small amounts of water into the bottom portion of the cooling tower, keeping the temperature of the collect fluid level within the bottom portion of the cooling tower at a constant temperature by not letting the collect fluid level within the bottom portion of the cooling tower become below a determine level. The addition of water in small amounts does not change the temperature of the collected fluid and solves the problem of increasing the temperature of the collected water by adding a large volume of water to the collect fluid level within the bottom portion of the cooling tower which does and will increase the temperature of the collected fluid and therefore reduces the cooling efficiency of the cooling tower and the cooling system.

The non-porous device is attached to an inner wall of the cooling tower. The protective container is placed on the bottom portion of the cooling tower and has a flow passage located in a lower part of the protective container in order to allow the collected fluid to flow into and out of the flow passage. The ultrasonic sensor and relay are inserted in (i.e. located within) the protective container.

A fluid channel device is located on the bottom portion of the cooling tower and is connected to the bottom portion of the cooling tower via a fastener or fasteners. The fluid channel device is positioned on the bottom portion of the cooling tower such that the opening in the middle section of the bottom portion of the cooling tower is covered by the fluid channel device. Additionally, the fluid channel device has a plurality of channels spaced along the length of the fluid channel device. The channels may have an elongated shape, a circular shape or any geometric or polygonal shape such that the collected fluid flows into the plurality of channels. The shape of the channels is designed such that the height of the channels allows the coldest lower level portion of the collected fluid to flow therethrough and is designed such that when the circulating pump(s) is/are operating at maximum power and flow rate, the collected fluid flows through the plurality of channels at a flow rate such that the at least one indirect heat exchanger pad is/are being maintained fully saturated (i.e. the outside surfaces of the at least one indirect heat exchanger pad is not devoid of a fluid) when the cooling tower and system are operational. The height and/or shape of the channels may all be same or some channels may have the same shape and other channels may have a different shape such that when the circulating pump(s) is/are operating at maximum power and flow rate, the collected fluid flows through the plurality of channels at a flow rate such that the at least one indirect heat exchanger pad is/are being maintained fully saturated. Also, the height of the channels may all be same or some channels may have the same height and other channels may have a different height such that when the circulating pump(s) is/are operating at maximum power and flow rate, the collected fluid flows through the plurality of channels at a flow rate such that the at least one indirect heat exchanger pad is/are being maintained fully saturated. The height of the channels is the maximum distance between the bottom portion of the cooling tower to the void of material in fluid channel device which forms the channel.

BRIEF DESCRIPTION OF THE DRAWINGS

In order to more clearly illustrate the embodiments of the present disclosure, a brief description of the drawings is given below. The following drawings are only illustrative of some of the embodiments of the present disclosure and for a person of ordinary skill in the art, other drawings or embodiments may be obtained from these drawings without inventive effort.

Figure 1:
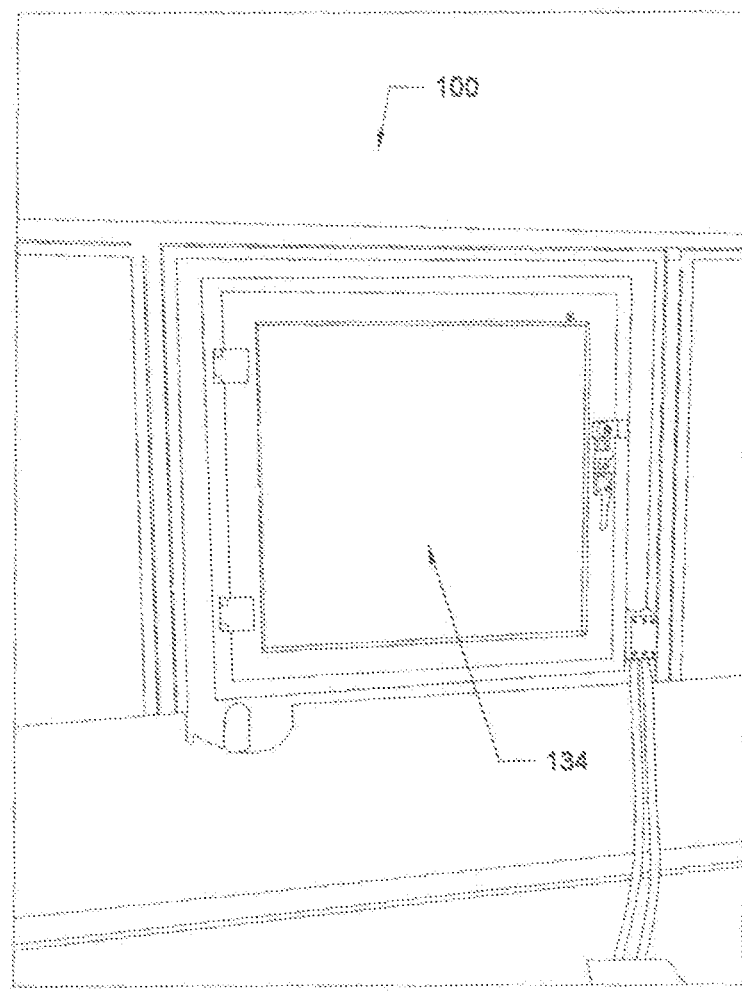
FIG. 1 is a schematic perspective external view of a cooling tower.

Reference numbers: 10—modified swamp cooler; 100—cooling tower; 101—indirect heat exchanger pads; 102—fan; 103—non-porous boards; 104—non-porous supports; 105—bottom portion of the cooling tower; 106—fluid channel device; 107—channels; 108—heat exchanger passages; 109—ultrasonic sensor and relay; 110—non-porous device; 111—protective container; 112—flow passage; 113—circulating pump; 114—grate/filter; 115—lower supporting apparatus; 116—air inlet; 117—louvers; 118—movable supports; 119—wheels; 120—fill valve; 121—drain; 123—conduit; 124—conduit apertures; 125—opening; 126—grooves; 127—non-porous backboard; 128—non-porous drain board; 129—fastener, 130—distribution apparatus; 131—distribution holes; 132—distribution apparatus inlet; 133—chilled water valve; 134—access door; 135—cooling tower top; 137—air outlet; 140—Y-strainer type filter; 141—dump valve; 142—outlet drain; 143—fan housing; 144—flow director; 145—door panel; 146—bottom portion of the distribution apparatus; 147—handle; 148—distribution plate; 150—bottom of the modified swamp cooler; 199—vent.

DETAILED DESCRIPTION

The technical solutions of the present disclosure will be clearly and completely described below with reference to the drawings. The embodiments described are only some of the embodiments of the present disclosure, rather than all of the embodiments. All other embodiments that are obtained by a person of ordinary skill in the art on the basis of the embodiments of the present disclosure without inventive effort shall be covered by the protective scope of the present disclosure.

In the description of the present disclosure, it is to be noted that the orientational or positional relation denoted by the terms such as "center", "upper", "lower", "left", "right", "vertical", "horizontal", "inner" and "outer" is based on the orientation or position relationship indicated by the figures, which only serves to facilitate describing the present disclosure and simplify the description, rather than indicating or suggesting that the device or element referred to must have a particular orientation, or is constructed or operated in a particular orientation, and therefore cannot be construed as a limitation on the present disclosure. In addition, the terms "first", "second" and "third" merely serve the purpose of description and should not be understood as an indication or implication of relative importance.

In the description of the present disclosure, it should be noted that unless otherwise explicitly specified and defined, the terms "install", "link", "attached" and "connect" shall be understood in the broadest sense, which may, for example, refer to fixed connection, detachable connection or integral connection; may refer to mechanical connection or electrical connection; may refer to direct connection or indirect connection by means of an intermediate medium; and may refer to communication between two elements. A person of ordinary skill in the art would understand the specific meaning of the terms in the present disclosure according to specific situations.

FIGS. 1-16 illustrate the present invention of a cooling tower 100 attached to a modified swamp cooler 10.

The below disclosed cooling system uses one hundred percent fresh ambient or outside air as the air suppled to a building or space which desires cool air. However, depending on the requirement for cooling, preconditioned air may be combined with the ambient or outside air for the air to be used for cooling a building or space.

Figure 2:
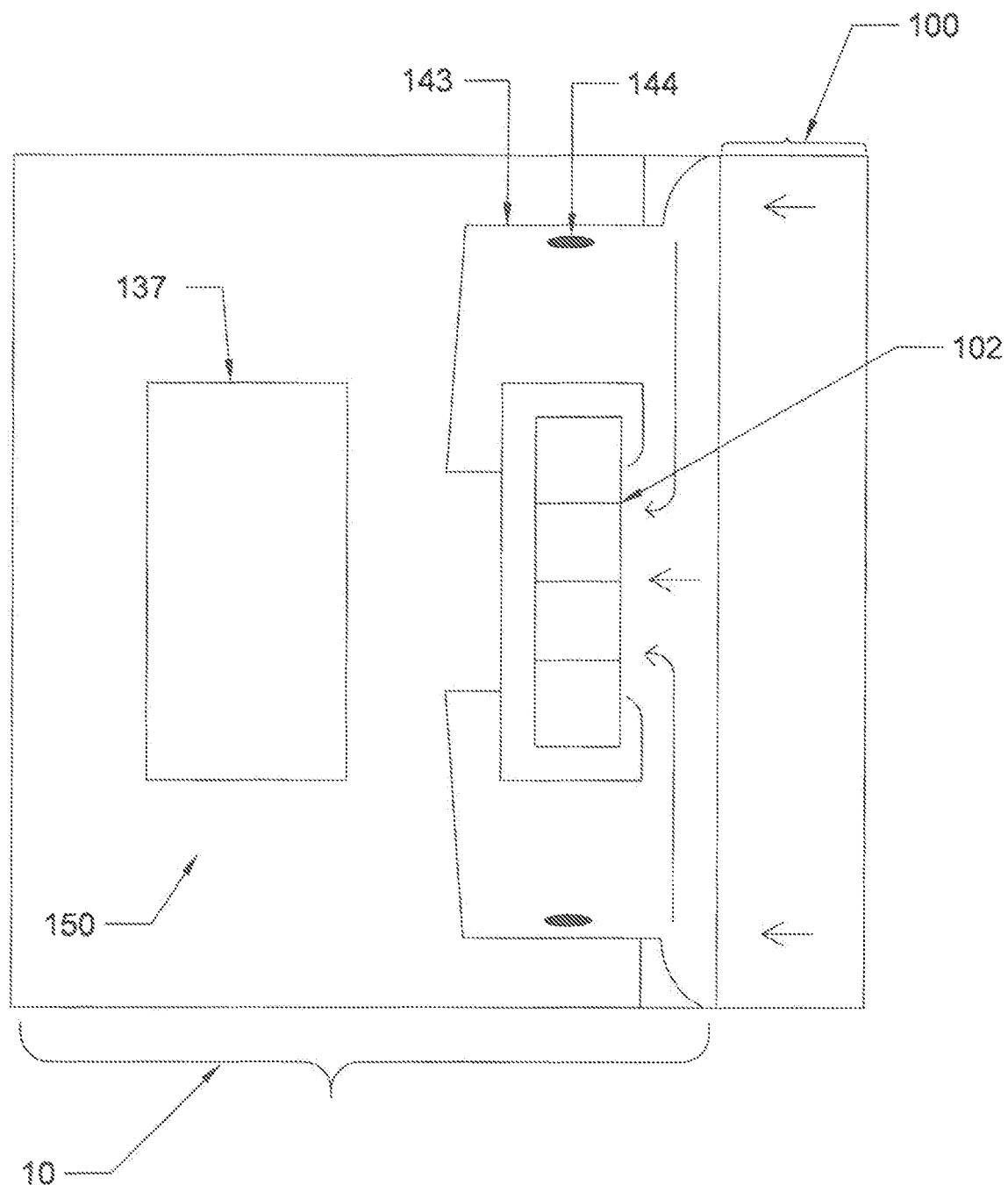
FIG. 2 is a schematic top view illustrating a fan and an air outlet within a modified swamp cooler and the cooling tower attached to one side of the swamp cooler, where the cooling tower and the modified swamp cooler are not drawn to scale nor to proportion relative to each other.
Figure 3:
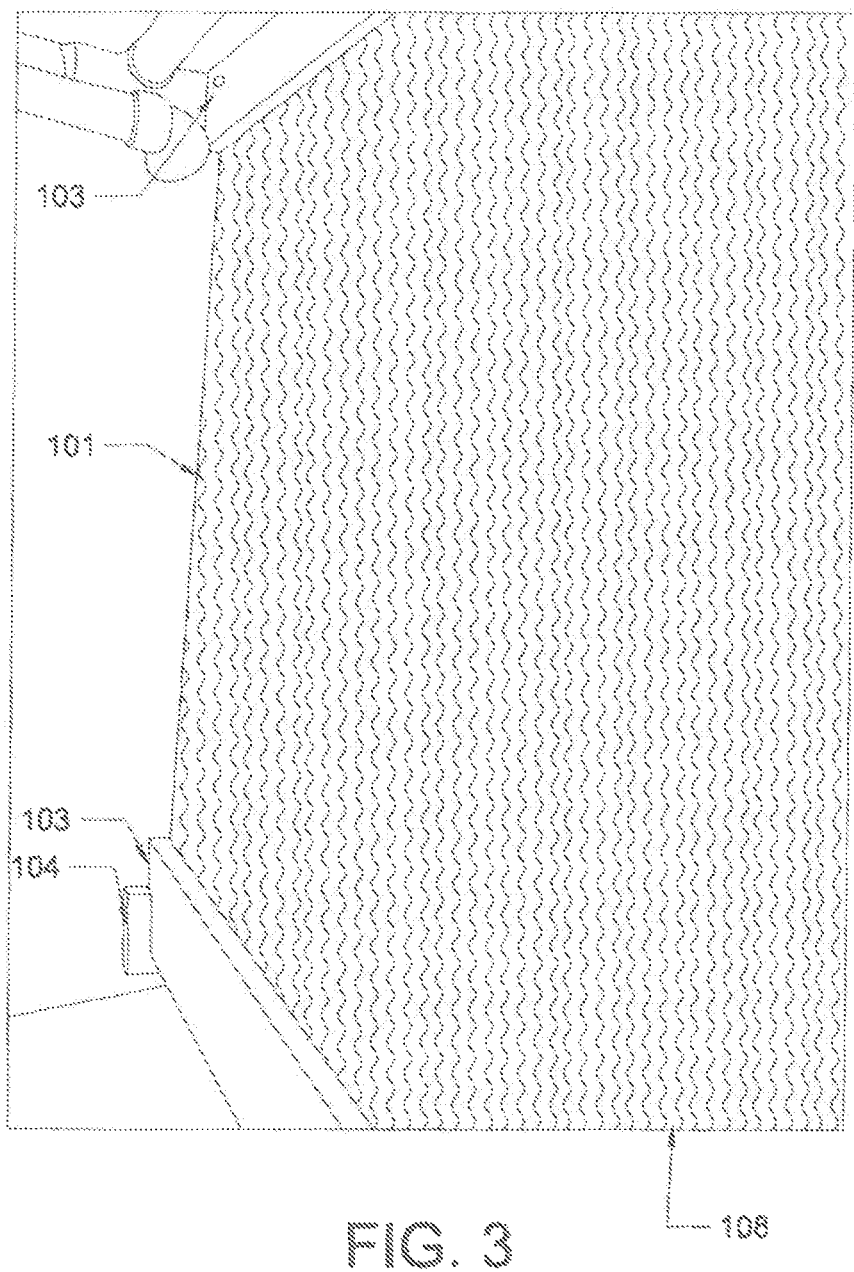
FIG. 3 is a schematic perspective view of at least one indirect cooling pad located in a right side of the cooling tower.
Figure 14:
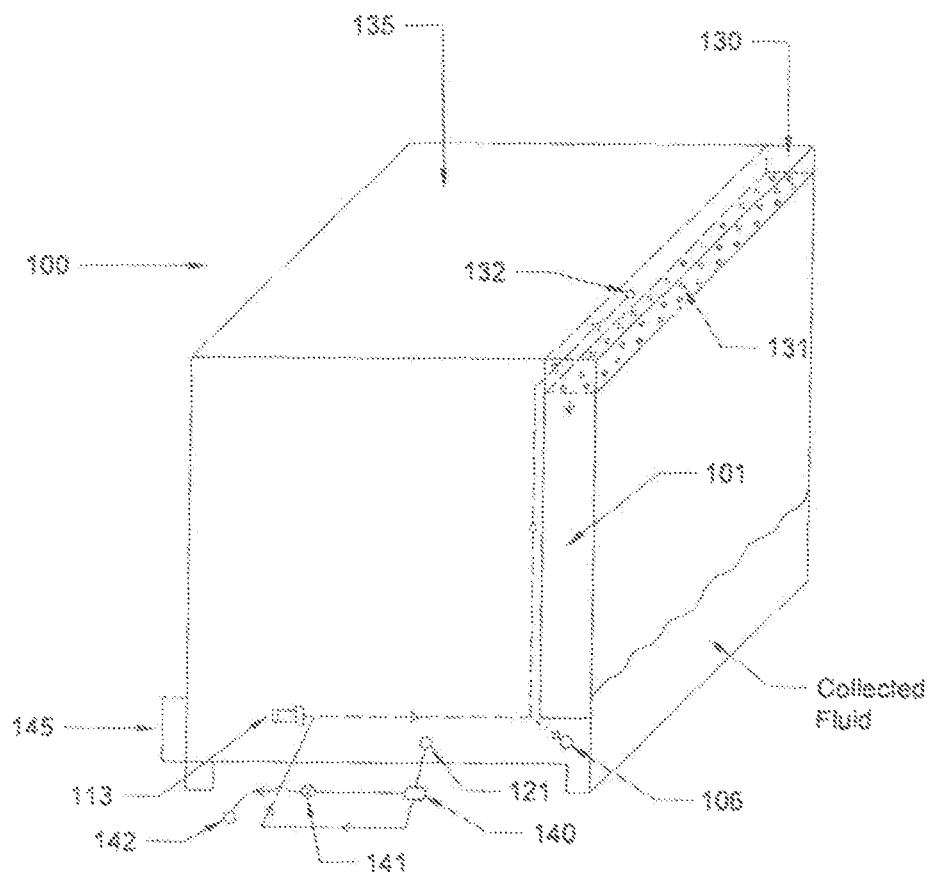
FIG. 14 is a perspective view of the cooling tower shown in the form of a box shape and illustrating only one side having an indirect heat exchanger pad with a distribution apparatus.

The cooling tower 100 and the modified swamp cooler 10 as shown in FIG. 1, FIG. 2 and FIG. 14 is in the general shape of a square or box shaped or rectangular shaped. The cooling tower 100 and the modified swamp cooler 10 may have a height in the range of two feet to twelve feet; a width in the range of two feet to twelve feet; and a depth in the range of two feet to twelve feet. As needed, the above height, width and depth ranges of the cooling tower 100 may be smaller and/or larger than the above disclosed ranges in order to meet design and cooling demands. However, the shape of the cooling tower 100 and the modified swamp cooler 10 can be any geometrical or polygonal shape. As shown in FIG. 1, FIG. 2, FIG. 4, and FIG. 14, the cooling tower is comprised of a front side which has access door 134, cooling tower top 135, bottom portion 105, a back side which is opposite the front side which has the access door 134 and at least one indirect heat exchanger pad 101, where the at least one indirect heat exchanger pad 101 is located on either side (i.e. on a left side, a right side or on both sides of the cooling tower 100; on each side of the access door 134 as shown in FIG. 1). The at least one indirect heat exchanger pad 101 can have the general shape of a rectangle. However, the shape of the at least one indirect heat exchanger pad 101 can be any geometrical or polygonal shape. The at least one indirect heat exchanger pad 101 may have a height in the range of two feet to twelve feet; a width in the range of two feet to twelve feet; and a depth in the range of two feet to twelve feet. As needed, the above height, width and depth ranges of the at least one indirect heat exchanger pad 101 may be smaller and/or larger than the above disclosed ranges in order to meet design and cooling demands. Also, the quantity/number of the indirect heat exchanger pad 101 installed in the cooling tower 100 have be in the range of one to ten.

Figure 11:
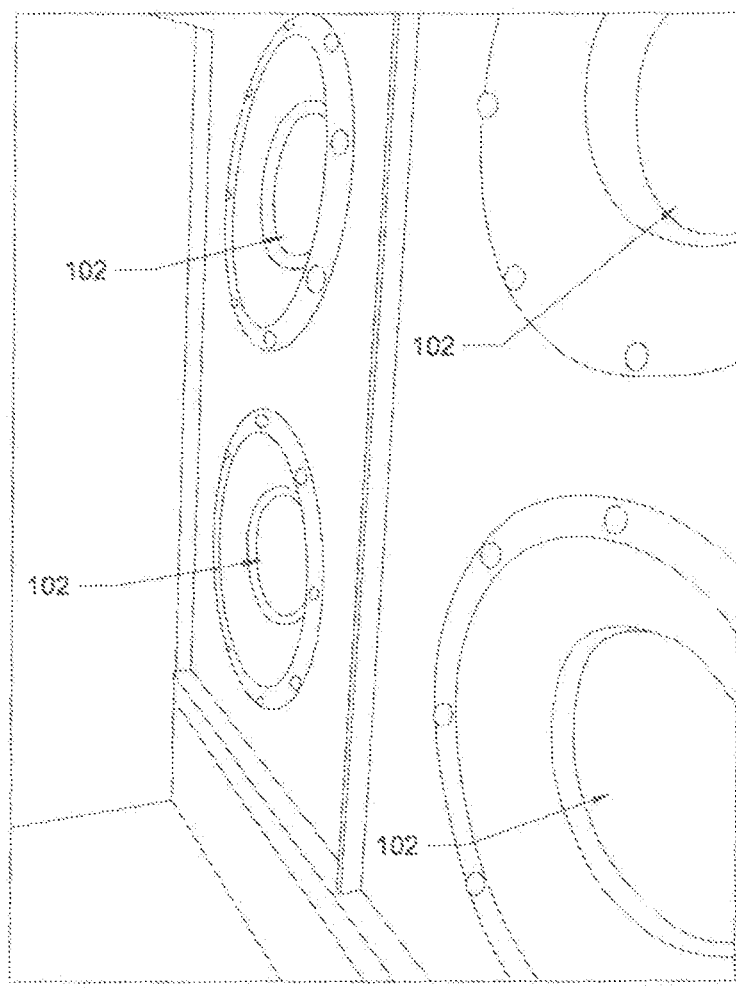
FIG. 11 is a schematic side perspective view of cooling fans.

As shown in FIG. 2 and FIG. 11, the modified swamp cooler 10 comprises at least fan 102, fan housing 143 and at least one flow director 144. As shown in FIG. 2, the fan housing 143 is spaced, in the inside of the modified swamp cooler 10, in the range of four to fifteen inches from a surface of the least one indirect heat exchanger pad 101, and preferably eight to ten inches from the at least one indirect heat exchanger pad 101. The at least one flow director 144 is mounted within the fan housing 143 in order to smoothly (i.e. providing a laminar flow rather than a turbulent flow) force the air out of at least one air outlet 137 of the modified swamp cooler 10 which reduces the amount of energy needed to operate the fan(s) 102.

The cooling tower 100 prevents deformation and forming gaps therein due to thermal warping by fastening and/or connecting the cooling tower sides (i.e. including the bottom/bottom portion and the top) together at the same hot temperature, which is in the range of 110° F. to 140° F. The fastening and/or connecting of the cooling tower sides together can be performed by welding, soldering, screws, bolts, fasteners, rivets or any other equivalent method. For example, all sides, including the bottom portion 105 and the top 135 of the cooling tower 100 are at the same steady state temperature of 120° F. Then all sides, including the bottom portion 105 and the top 135 of the cooling tower 100 having the same steady state temperature of 120° F. are welded together to form the cooling tower 100. The temperature of 120° F. was just a chosen temperature used in the above example, but the temperature may be any temperature within the range of 110° F. to 140° F.

All inside surfaces includes all walls and other surfaces of apparatus, except for the surfaces of the at least one indirect heat exchanger pad 101, of the cooling tower 100, are made from a non-porous material and not metal. The non-porous surfaces can be made by known methods of manufacturing as well as molding, coating or 3-D printing. Preferably, all inside surfaces of the cooling tower 100, except for the surfaces of the at least one indirect heat exchanger pad 101, are made from and/or comprise high-density polyethylene (HDPE) in order to solve the problem of mold, mildew, calcination and deposits of metals forming on the inner surface of the cooling tower 100 because if all inside surfaces of the cooling tower 100, except for the surfaces of the at least one indirect heat exchanger pad 101, are made from and/or comprise HDPE then mold, mildew, calcination and deposits of metals including alkaline earth metals and/or other metals are prevented from forming on the inner surfaces of the cooling tower 100 and this prevention of mold, mildew, calcination and deposits of metals increases the cooling efficiency during the operational life of the cooling tower 100 and the evaporative cooling system.

High-density polyethylene (HDPE) or polyethylene high-density (PEHD) is a thermoplastic polymer produced from the monomer ethylene. One example of HPDE which is used is a Marine Grade HDPE such as SEABOARD™ or STARBOARD™ made by Ridout Plastics Co. Inc. The Marine Grade HDPE can be the color of polar white or any other known color. The Marine grade HDPE has superior scratch and impact resistance, high stiffness, is ultraviolet (UV) stabilized, will not delaminate, chip, rot, or swell, is easy to machine with standard tooling, is a low energy material and has no moisture absorption, is easy to clean and is FDA and USDA approved with UV additive. The thickness used on all surfaces of the cooling tower of the Marine Grade HDPE is in the range of one sixteenth of an inch to six inches. The above characteristics and benefits are needed and required to make the disclosed cooling tower prevent the formation of mold, mildew, calcination and deposits of metals, prevent thermal warping and increase the cooling efficiency during the operational life of the cooling tower and the evaporative cooling system.

Polyesters are formed by polyalkylene terephthalates having alkyl groups or radicals comprising 2 to 10 carbon atoms and polyalkylene terephthalates having alkyl groups or radicals containing 2 to 10 carbon atoms which are interrupted by 1 or 2 —O—. Further, polyesters can be polyalkylene terephthalates having 5 alkyl groups or radicals containing 2 to 4 carbon atoms.

Examples of polyolefin materials are polyethylenes (PE) which include high density polyethylene (HDPE) having a density greater than 0.944 g/cm$^3$, medium density polyethylene (MDPE) having a density in the range of 0.926 g/cm$^3$ to 0.940 g/cm$^3$, low density polyethylene (LDPE) having a density in the range of 0.910 g/cm$^3$ to 0.925 g/cm$^3$, in the form of nonoriented sheets (PE sheet) or monoaxially or biaxially oriented sheets (oPE sheet), polypropylenes (PP), such as axially or biaxially oriented polypropylene (oPP sheet) or cast polypropylene (cPP sheet), amorphous or crystalline polypropylene or blends thereof or atactic or isotactic polypropylene or blends thereof, poly(1-butene), poly(3-methylbutene), poly(4 methylpentene) and copolymers thereof, then polyethylene with vinyl acetate, vinyl alcohol or acrylic acid, such as, for example, ionomer resins, such as copolymers of ethylene, of acrylic acid, of methacrylic acid, of acrylic esters, tetrafluoroethylene or polypropylene, in addition random copolymers, block copolymers or olefin polymer/elastomer blends. The polyolefin materials can also comprise cycloolefins as monomer of a homopolymer or of copolymers.

The disclosed invention uses on all inside surfaces of the cooling tower 100, except for the surfaces of the at least one indirect heat exchanger pad 101, high-density polyethylenes. However, polypropylenes and ionomers having the density of the range of HPDE, may be used on all inside surfaces of the cooling tower 100, except for the surfaces of the at least one indirect heat exchanger pad 101. If desired, only a portion or portions of the inside surface or surfaces of the cooling tower 100, except for the surfaces of the at least one indirect heat exchanger pad 100, are made from and/or comprise a non-porous material such as high-density polyethylene (HDPE). However, it is best and preferred if all inside surfaces of the cooling tower, except for the surfaces of the indirect heat exchanger pads, are made from and/or comprise a non-porous material such as high-density polyethylene (HDPE) and not made from metal.

Examples of polyamides (PA) for the plastics sheets are composed, for example, of polyamide 6, ε-caprolactam homopolymer (polycaprolactam); polyamide 11; polyamide 12, ω-lauryllactam homopolymer (polylauryllactam); polyamide 6,6, homopolycondensate of hexamethylenediamine and of adipic acid (poly(hexamethylene adipamide)); polyamide 6,10, homopolycondensate of hexamethylenediamine and of sebacic acid (poly(hexamethylene sebacamide)); polyamide 6,12, homopolycondensate of hexamethylenediamine and of dodecandioic acid (poly(hexamethylene dodecanamide)) or polyamide 6-3-T, homopolycondensate of trimethylhexamethylenediamine and of terephthalic acid (poly(trimethylhexamethylene terephthalamide)), and blends thereof. The polyamide sheets are drawn monoaxially or biaxially (oPA).

One of many benefits of HDPE is from HDPE's inherent malleability such a being meltable and moldable as well as being a low-cost material. HDPE has a high melting point which is in the range of 239° F.-275° F. and therefore, HDPE remains rigid at very high temperatures. However, once HDPE reaches its melting point, the HDPE material can be quickly and efficiently molded for use. Moreover, HDPE can be shaped and/or made into any desired geometric or polygonal shape by using, for example, a 3-D printer.

Additionally, HDPE is corrosion resistance. HDPE resists mold, mildew and rotting, making HDPE the ideal material for being used in the cooling tower 100, which is exposed to water due, to the HDPE resisting mold and mildew which results in low maintenance and less frequent cleaning of the cooling tower 100 and conventional metal and porous cooling towers. HDPE is long-lasting and weather-resistant and can be sterilized by boiling. Additionally, HDPE can withstand most strong mineral acids and bases and has excellent resistance to naturally occurring chemicals. Moreover, the material of HDPE is non-porous and virtually impervious to most common chemicals, water, solvents, acids, detergents, and cleaning fluids. Therefore, calcination and metals from water are prevented from forming on the surface of HDPE.

HDPE has a large strength to density ratio. HDPE's linear structure means the material has little branching, which offers HDPE stronger intermolecular forces and tensile strength than MDPE and LDPE. HDPE plastic is easily recyclable and therefore reduces non-biodegradable waste from being introduced into landfills and helps reduce plastic production.

One example of an evaporative cooler in the cooling tower which is attached to at least one side of the modified swamp cooler 10 is disclosed below.

Throughout the entire disclosure, it should be noted that the modified swamp cooler does not have heat exchangers nor fluid spraying, pumping and measuring devices and apparatus located within the swamp cooler. The modified swamp cooler does have a fan 102 or fans 102 located therein. However, all surfaces of the fan(s) 102 are coated and/or made from a non-porous material such as high-density polyethylene (HDPE) which prevents the formation of mold, mildew, calcination and deposits of metals and minerals from forming on the surfaces of the fan. The non-porous surfaces can be made by known methods of manufacturing as well as molding, coating or 3-D printing.

As shown in FIG. 1, FIG. 2, FIG. 3, FIG. 11 and FIG. 14, ambient or outside is forced through a plurality of heat exchanger passages 108 in the at least one indirect heat exchanger pad 101 via the fan 102 or a plurality of fans 102 and a cooling fluid such as water flows over outer surfaces of the at least one indirect heat exchanger pad 101 which cools the hot ambient air and air exits the cooling tower 100 through at least one air outlet 137. The fan(s) 102 is/are located within the modified swamp cooler 10 and the water and the at least one indirect heat exchanger pad 101 are located within the cooling tower 100.

As shown in FIG. 2 and FIG. 11, the fan(s) 102 is/are a motorized impeller variable frequency drive (VFD) fan. Therefore, the outside air is pulled through the at least one indirect heat exchanger pad 101 from outside of the cooling tower 100 to inside the cooling tower 100, then flows through an air outlet of the cooling tower into an inlet of the modified swamp cooler 10. The fan 102 is mounted within the modified swamp cooler 10. Therefore, there is only one air inlet within the enclosure of the modified swamp cooler 10 which is in fluid communication with an air outlet of the cooling tower 100 such that the cooling tower 100 is attached to the modified swamp cooler 10 where the air inlet of the modified swamp cooler 10 matches up with the air outlet of the cooling tower 100 as shown in FIG. 2.

As shown in FIG. 2, FIG. 3, FIG. 4, FIG. 11, FIG. 14 and FIG. 16, the at least one indirect heat exchanger pad 101 is located on either a left side, a right side or both the left and right sides of the cooling tower 100 and cooled ambient air flows out an air outlet of the cooling tower 100, then into an inlet of the modified swamp cooler 10 and then at least one air outlet 137 of the modified swamp cooler 10. The at least one air outlet 137 is formed on the bottom 150 of the modified swamp cooler 10. Therefore, there is no air outlet in the top/roof 135 of the cooling tower 100. One of the air outlets 137 is comprised of an aperture through the bottom 150 of the modified swamp cooler 10.

Figure 9:
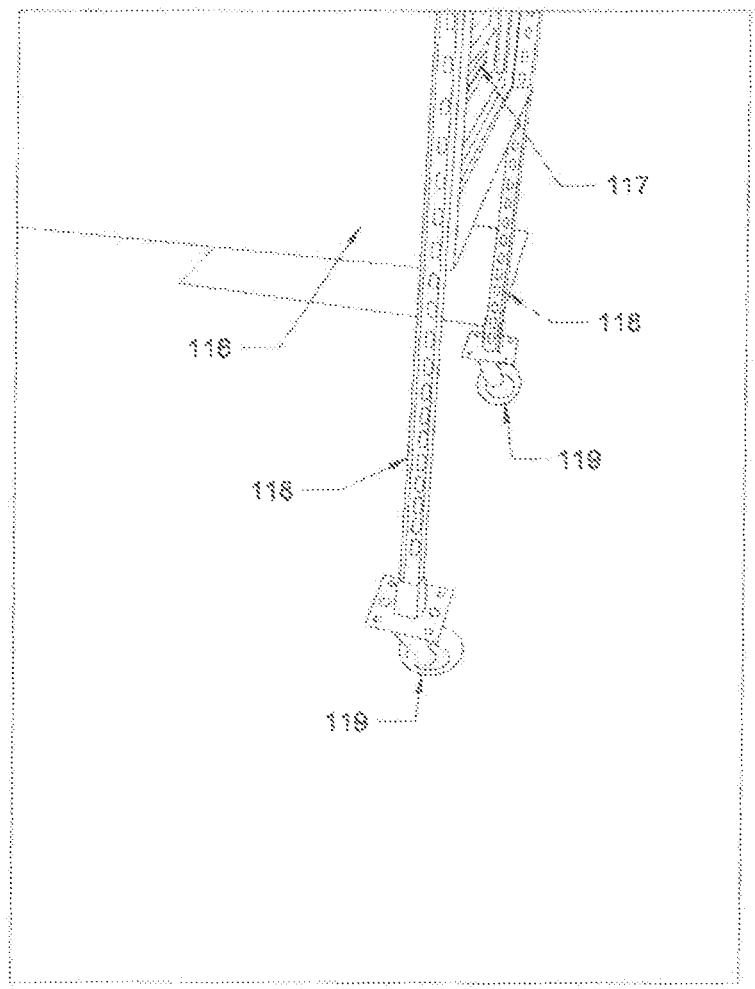
FIG. 9 is a schematic side perspective view of an inlet apparatus.
Figure 10:
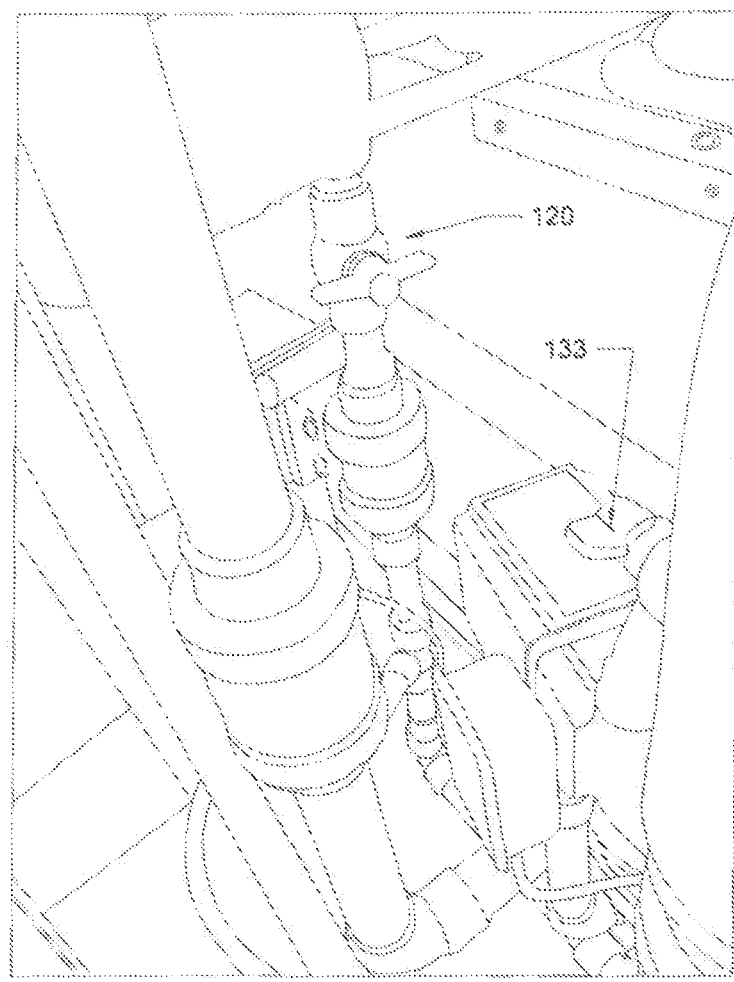
FIG. 10 is a top perspective view of a fill valve and a chilled water valve in fluid communication with a distribution apparatus.

Additionally, as shown in FIG. 9, any ambient air inlet can comprise louvers 117 and/or movable supports 118 such that the air inlet can be moved using wheels 119 in order to perform maintenance and such that the air inlet can be closed to the ambient environment to protect the cooling tower 100 form unwanted environmental debris and conditions such as dust, wind and thunderstorms The cooling fluid, such as water, which has now flowed over the outer surfaces of the at least one indirect heat exchanger pad 101, exits the at least one indirect heat exchanger pad 101 via the force of gravity and is collected in a bottom portion 105 of the cooling tower 100. As shown in FIGS. 3-7 and FIG. 14, the bottom portion 105 of the cooling tower 100 has a slanted or curved shape which enables the collected cooling fluid exiting the at least one indirect heat exchanger pad 101 to flow to a middle section of the bottom portion 105 of the cooling tower 100 where the collected fluid flows through opening 125 in the middle section where this collected fluid is pumped via circulating pump 113 to distribution apparatus 130.

Figure 12:
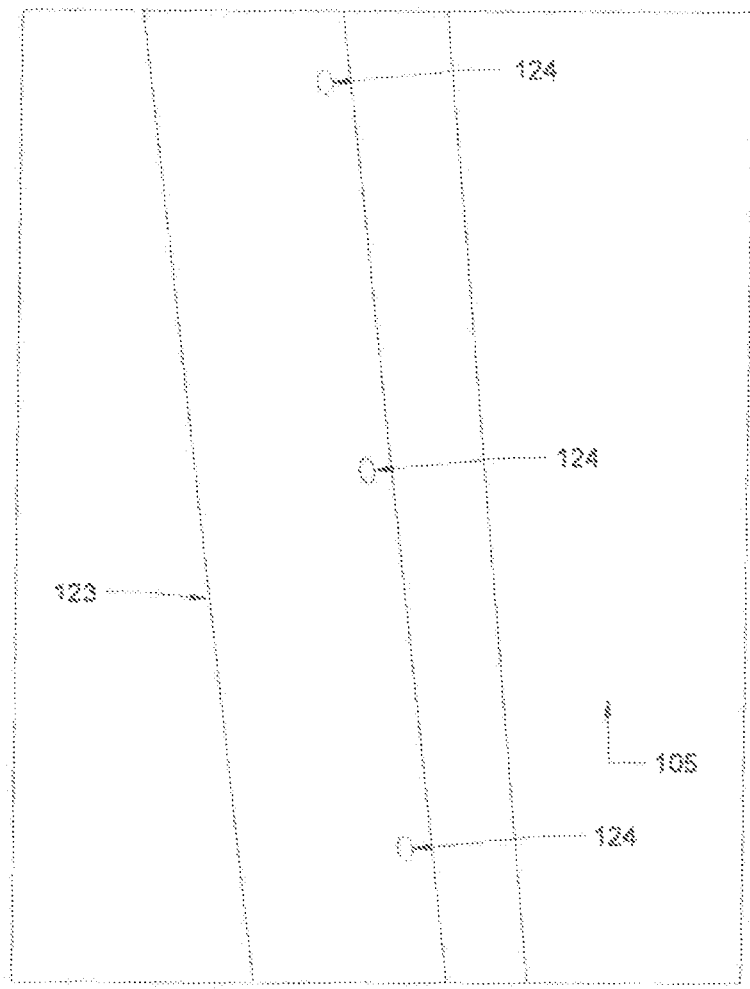
FIG. 12 is a bottom perspective view of a conduit with conduit apertures.

FIG. 12 illustrates a plurality of conduit apertures 124 are located within a bottom of conduit 123, where the conduit 123 is located in above the bottom portion 105 of the cooling tower 100 which can be used to clean the cooling tower 100.

Figure 4:
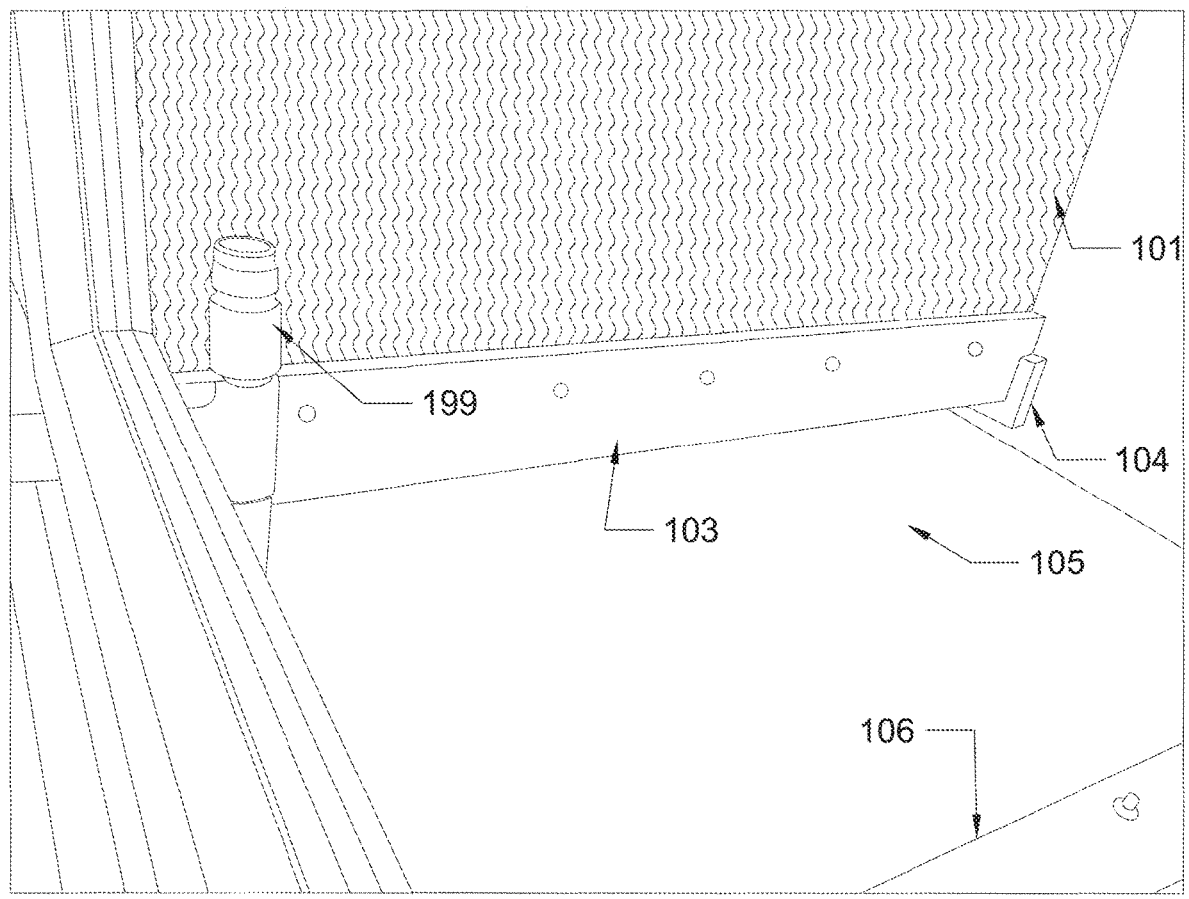
FIG. 4 is a schematic perspective view of a bottom portion inside the cooling tower and at least one indirect cooling pad located in a left side of the cooling tower.
Figure 5:
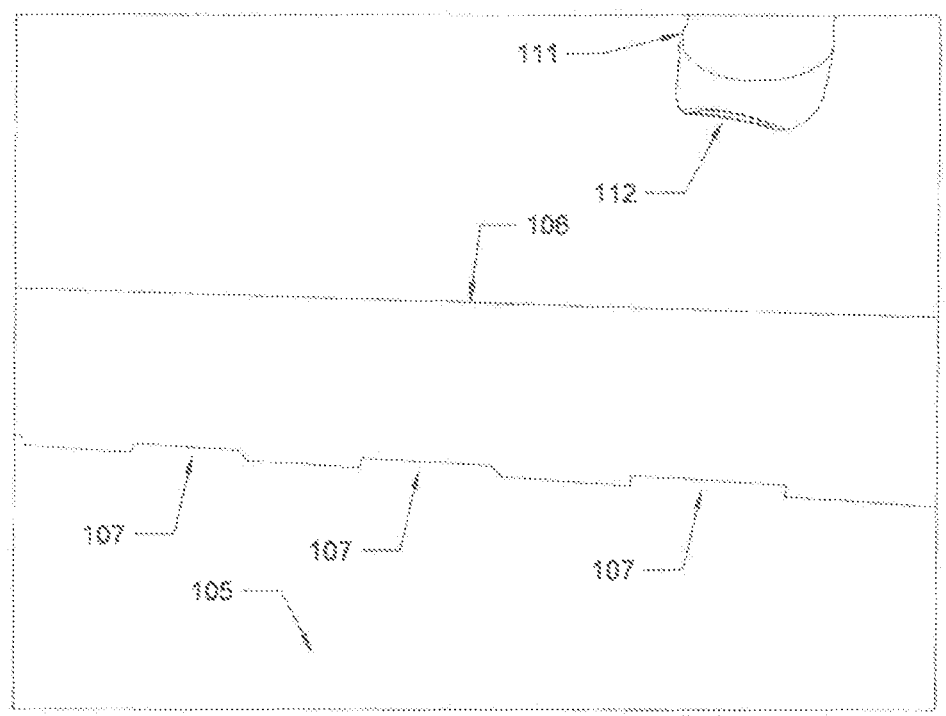
FIG. 5 is a schematic top perspective view of a fluid channel device on the bottom portion inside the cooling tower.

As shown in FIG. 4 and FIG. 14, vent 199, drain 121, filter 140, dump valve 141 and outlet drain 142 are fluidly connected to the opening 125 in the middle section and the filter 140 is located upstream from the circulating pump 113 in order to remove dirt or sediment from the collected fluid which has flowed through the opening 125 in the middle section of the bottom portion 105 of the cooling tower 100. The top of the vent 199 is covered and the vent 199 is a one-way flow vent with at least one hole therein which allows collected fluid to be released to the drain 121. The vent 199 can be of a type of studor vent. The filter can be Y-strainer type filter 140 or any type of known filter. The type of value(s) used can be any known type of valve.

The drain 121 is attached to the bottom portion 105 of the cooling tower 100 and is in fluid connection with the collected fluid in order to remove and/or drain the collected fluid from the bottom portion 105 of the cooling tower 100 at any desired time.

Figure 16:
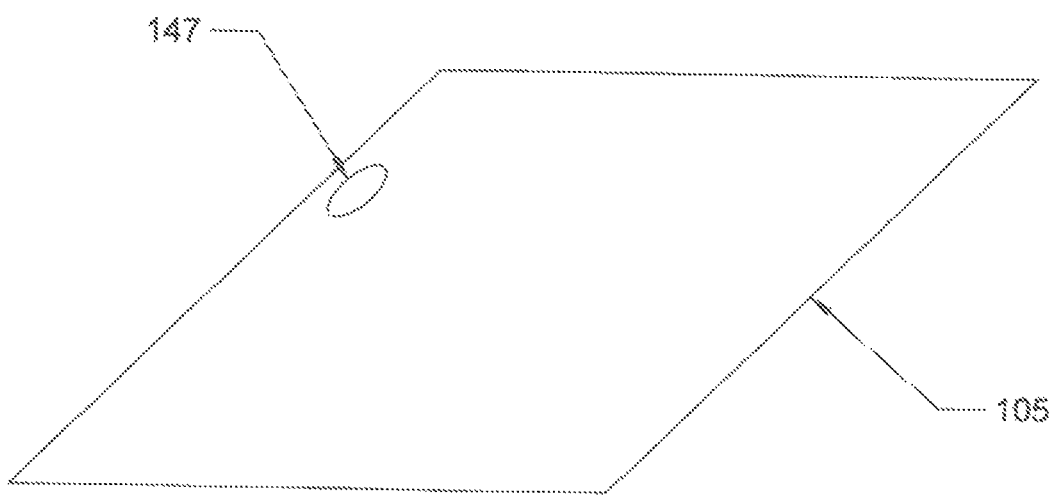
FIG. 16 is a perspective view of the bottom portion of the cooling tower illustrating a handle in the bottom portion of the cooling tower.

As illustrated in FIG. 16, the bottom portion 105 of the cooling tower 100 comprises a handle 147 in order to easily lift up and remove the bottom portion 105 of the cooling tower 100 for maintenance.

The circulating pump 113 is a seal less magnetically drive pump and also is a variable frequency drive (VFD) pump. The circulating pump 113 can operate in the range of one to three amps which decreases operating costs and still meet the cooling systems load requirement due to using less power than convention cooling systems. All of the inner surfaces of the fluid passages through which the collected fluid flows through the circulating pump 113 is not metal in order to solve the problem of calcium, alkaline earth metals and/or other metals forming on the surface of the fluid passages. Therefore, all of the inner surfaces of the fluid passages in the circulating pump 113 which the collected fluid flows through are made of a non-porous material such as high-density polyethylene (HDPE) because HDPE resists mold, mildew as well as prevents calcination and the formation of metal deposits. However, the circulating pumps can be any pump which has inner surfaces of the fluid passages in the circulating pump being made of a non-porous material such as high-density polyethylene (HDPE).

Since the fan(s) 102 is/are a motorized impeller variable frequency drive (VFD) fan, and the circulating pump 113 is a variable frequency drive (VFD) pump, the fan(s) 102, and the circulating pump 113 can be operated in conjunction with each other and at low speeds and low amperage in order to satisfy the requirements of the cooling capacity given an outside air temperature in order to increase the cooling towers and cooling systems efficiency because operating the at least one fan 102 and/or the circulating pump 113 at low speeds lowers air velocity and fluid pump flow and therefore increases the time (i.e. dwell time) the air and fluid are within the at least one indirect heat exchanger pad which increases the heat transfer effectiveness significantly while reducing the electric power to the fan(s) 102 and/or the circulating pump 113.

Additionally, as shown in FIGS. 3-8, the present invention attaches non-porous boards 103 on the front and back sides of the at least one indirect heat exchanger pad 101 at both the upper and lower ends of the at least one indirect heat exchanger pads 101. Non-porous supports 104 are attached to walls of the cooling tower 100 such that the non-porous boards 103, which are attached at the lower ends of the at least one indirect heat exchanger pad 101, are supported by the non-porous supports 104. For example, the non-porous supports 104 have a groove and the non-porous boards are located within the grooves 126 of the non-porous supports 104 such that a space is formed between the bottom surface of the at least one indirect heat exchanger pad 101 and the bottom portion 105 of the cooling tower 100. The non-porous boards 103 are removably fastened to the at least one indirect heat exchanger pad 101 for the purpose of being able to easily remove the at least one indirect heat exchanger pad 101 from the cooling tower 100 in order to perform cleaning and/or maintenance or to replace the at least one indirect heat exchanger pad 101. The non-porous supports 104 and non-porous boards 103 are made from and/or comprise high-density polyethylene. Furthermore, the non-porous boards 103 can be rectangular shaped, any other geometrical or polygonal shape and/or can have any aerodynamic shape in order create a smooth or laminar flow to any air contacting the non-porous boards 103.

As shown in FIG. 14, door panel 145 is located on one side and/or on a bottom of the cooling tower 100 in order to easily access the circulating pump 113 or pumps and/or any other apparatus.

Figure 7:
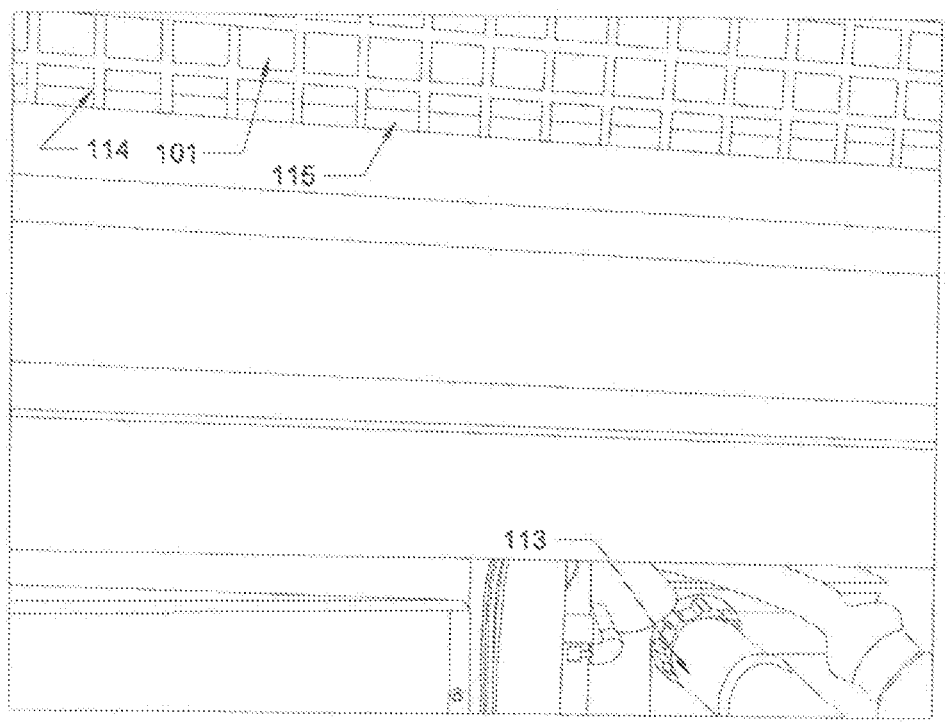
FIG. 7 is a schematic perspective view of a grate attached to the outside surface of the cooling tower.
Figure 13:
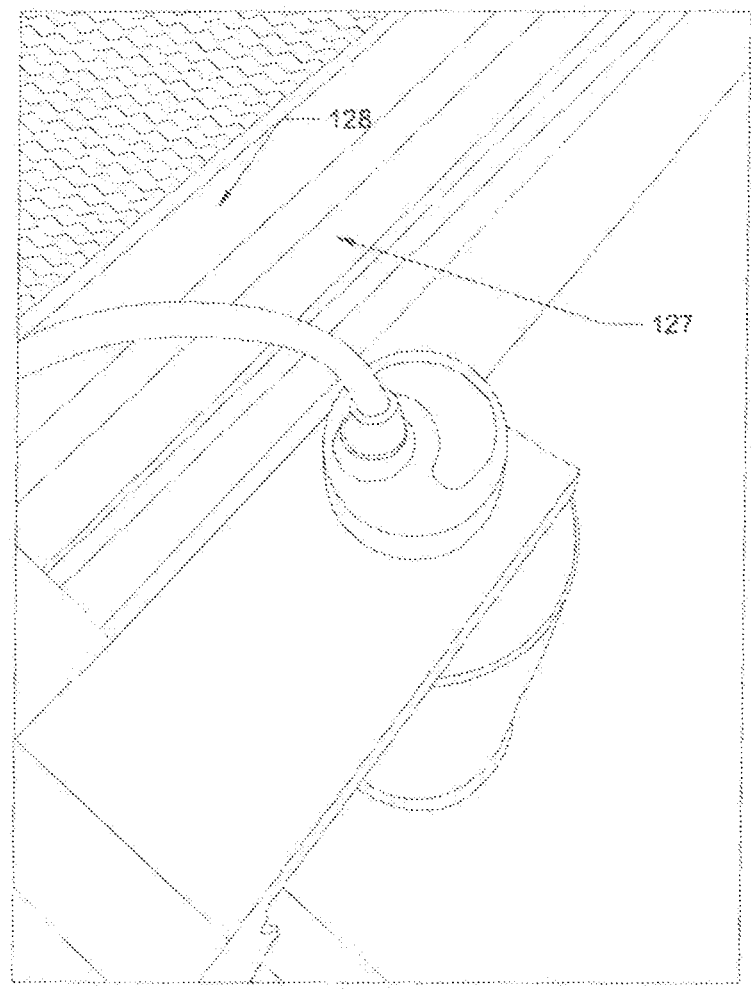
FIG. 13 is a top perspective view of a lower supporting apparatus.

As shown in FIG. 7 and FIG. 13, lower supporting apparatus 115 is attached to the outer surface of the at least one indirect heat exchanger pad 101 which solves the problem of preventing the fluid which has flowed over the outer surfaces of the at least one indirect heat exchanger pad 101 from splashing or flowing out from the cooling tower 100, which reduces the loss and use of water in the cooling system. The lower supporting apparatus 115 comprises non-porous backboard 127 and non-porous drain board 128, where the non-porous drain board 128 makes an angle in the range of five to twenty-two degrees with a horizontal line (i.e. a flat/non-vertical line such as the x-axis in the conventional x-y coordinate system).

As shown in FIG. 7, filter or grate 114 is attached to an outer surface of the cooling tower 100. The filter or grate 114 is located on the side of the cooling tower, which has the at least one indirect heat exchanger pad 101, that is the side which is not attached to the modified swamp cooler 10. A distance between an inner surface of the filter or grate 114 and a surface of the at least one indirect heat exchanger pad 101 is in the range of four to six inches. The distance between the inner surface of the filter or grate 114 is critical because the distance solves two interconnected problems. First, the distance solves the prevention of calcination or the prevention of other metals collecting on the surface of the at least one indirect heat exchanger pad 101 by having ambient or outside side flowing uniformly (i.e. the second solved problem) through the entire surface area of the at least one indirect heat exchanger pad 101.

Figure 15:
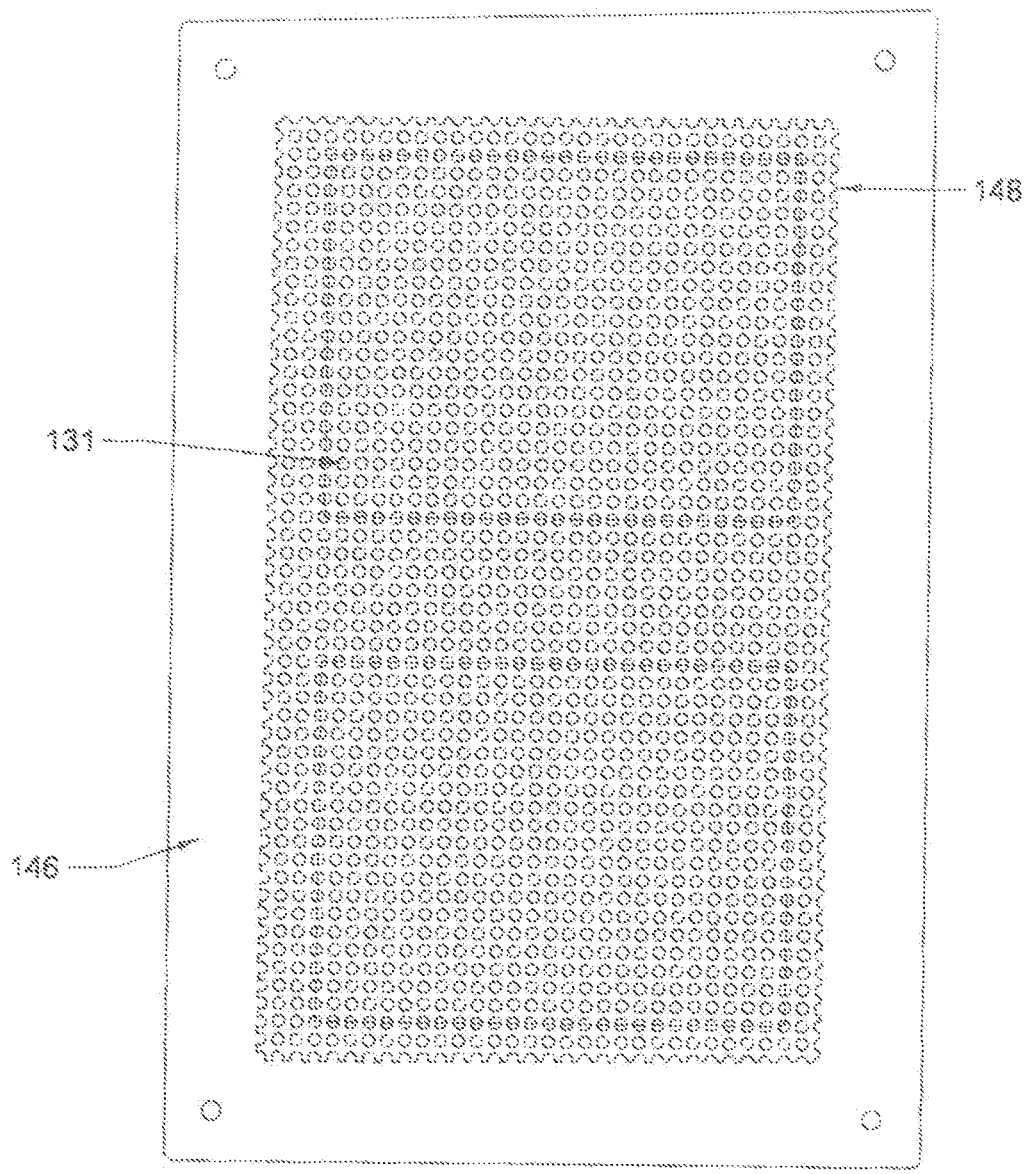
FIG. 15 is a top view of the distribution apparatus and a distribution plate.

As shown in FIG. 14 and FIG. 15, at a top portion of the at least one indirect heat exchanger pad 101, a distribution apparatus 130 is position above the top portion of the indirect heat exchanger pads 101 and a fluid line is fluidly connected to the distribution apparatus 130 and pressurized by the circulating pump 113. The fluid line is fluidly connected to the distribution apparatus 130 from inside the cooling tower 100, so the fluid is not in direct contact with the sun and is prevented from being heated by the direct rays or other hot elements from outside of the cooling tower 100. The distribution apparatus 130 has a plurality of holes 131 in a distribution plate 148 and the plurality of distribution holes 131 are arranged in a staggered arrangement or random arrangement so as to evenly allow the pressurized fluid to flow through the plurality of distribution holes 131 onto the outer surface of the at least one indirect heat exchanger pad 101. Further, the distribution apparatus 130 has distribution apparatus inlet 132. However, the distribution apparatus 130 can have an open bottom portion 146 comprising a plurality of distribution holes 131 therein, therefore the distribution plate is not needed, and the plurality of distribution holes 131 are arranged in a staggered arrangement or random arrangement so as to evenly allow the pressurized fluid to flow through the plurality of distribution holes 131 onto the outer surface of the at least one indirect heat exchanger pad 101.

The distribution apparatus 130 is in the same shape as the top portion of the at least one indirect heat exchanger pad 101 in order to fully coat all surfaces of the at least one indirect heat exchanger pad 101 with a fluid. Therefore, the distribution apparatus 130 is in the general shape of a rectangle where the sides and top of the distribution apparatus 130 form a fluid tight apparatus and the bottom portion 146 of the distribution apparatus 130 allows a fluid to pass therethrough. At least one side of the distribution apparatus 130 has a fluid inlet 132 for the fluid pumped via the circulating pump(s) 113 to enter the distribution apparatus 130. Therefore, the top and all sides of the distribution apparatus 130, except for the portion of the side which has the fluid inlet 132, do not allow passage of a fluid (i.e. are closed to atmospheric air).

By having the fluid being introduced into the distribution apparatus 130 under pressure (i.e. more than atmospheric pressure) by the circulating pump 113, as opposed to having the fluid operating under atmospheric pressure solves the problem of being able to either increase or decrease the flow rate over the outer surfaces of the at least one indirect heat exchanger pad 101. Furthermore, since the fluid is pressurized by the circulating pump(s) 113, this has allowed Applicant to create distribution hole 131 sizes within the distribution apparatus 130 such that the fluid level within the distribution apparatus 130 stays at a constant level and/or maintains a level such that the outer surfaces of the at least one indirect heat exchanger pad 101 is always fully coated or saturated during use. The distribution holes 131 can be round, circular or any geometric or polygon shape. The size of the distribution holes 131 can have a diameter of one sixteenth of an inch to four inches. However, the distribution hole 131 diameters can be smaller and/or larger than one sixteenth of an inch or four inches. When the opening of the distribution holes 131 is not circular in shape, then the distribution holes 131 opening can be one sixteenth of an inch to four inches or can be larger or smaller than one sixteenth of an inch or four inches. The distribution holes 131 may all have the same size or may have different sizes in order to create distribution hole 131 sizes within the distribution apparatus 130 such that the fluid level within the distribution apparatus 130 stays at a constant level and/or maintains a level such that the outer surfaces of the at least one indirect heat exchanger pad 101 is always fully coated or saturated during use.

As shown in FIG. 4, FIG. 5, FIG. 6 and FIG. 10, ultrasonic sensor and relay 109 are located above the bottom portion 105 of the cooling tower 100, attached to non-porous device 110 and are inserted within protective container 111. The ultrasonic sensor and relay 109 senses and determine the collect fluid level within the bottom portion 105 of the cooling tower 100 and send signals to a relay in the cooling system and to fill valve 120 and/or chilled water valve 133, which is fluidly connected to the distribution apparatus 130. The ultrasonic sensor and relay 109 send signals to the fill valve 120 and/or chilled water valve 133 such that the fill valve 120 and/or chilled water valve 133 operates such in a manner to add small amounts of water into the bottom portion 105 of the cooling tower 100, keeping the temperature of the collect fluid level within the bottom portion 105 of the cooling tower 100 at a constant temperature by not letting the collect fluid level within the bottom portion 105 of the cooling tower 100 become below a determine level. The addition of water in small amounts does not change the temperature of the collected fluid and solves the problem of increasing the temperature of the collected water by adding a large volume of water to the collect fluid level within the bottom portion 105 of the cooling tower 100 which does and will increase the temperature of the collected fluid and therefore reduces the cooling efficiency of the cooling tower 100 and the cooling system.

Figure 6:
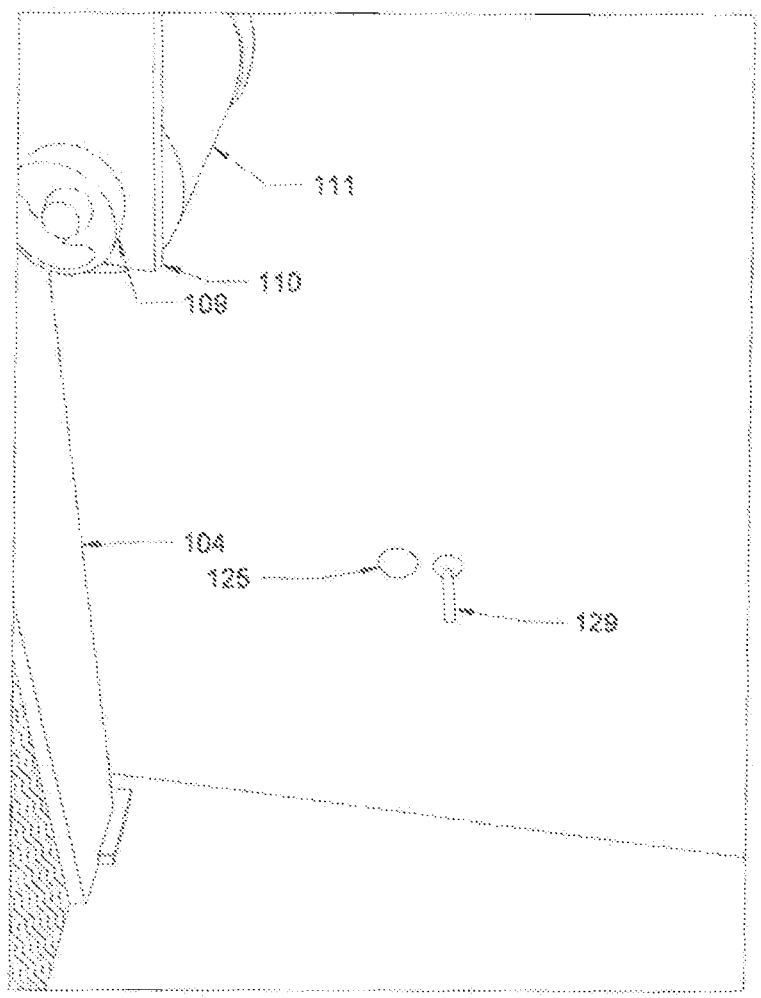
FIG. 6 is a schematic top perspective view of an ultrasonic sensor and relay inside the cooling tower.

As shown in FIG. 6, the non-porous device 110 is attached to an inner wall of the cooling tower 100. The protective container 111 is placed on the bottom portion 105 of the cooling tower 100 and has flow passage 112 located at a lower part of the protective container 111 in order to allow the collected fluid to flow into and out of the flow passage 112. The ultrasonic sensor and relay 109 are inserted in (i.e. located within) the protective container 111.

Figure 8:
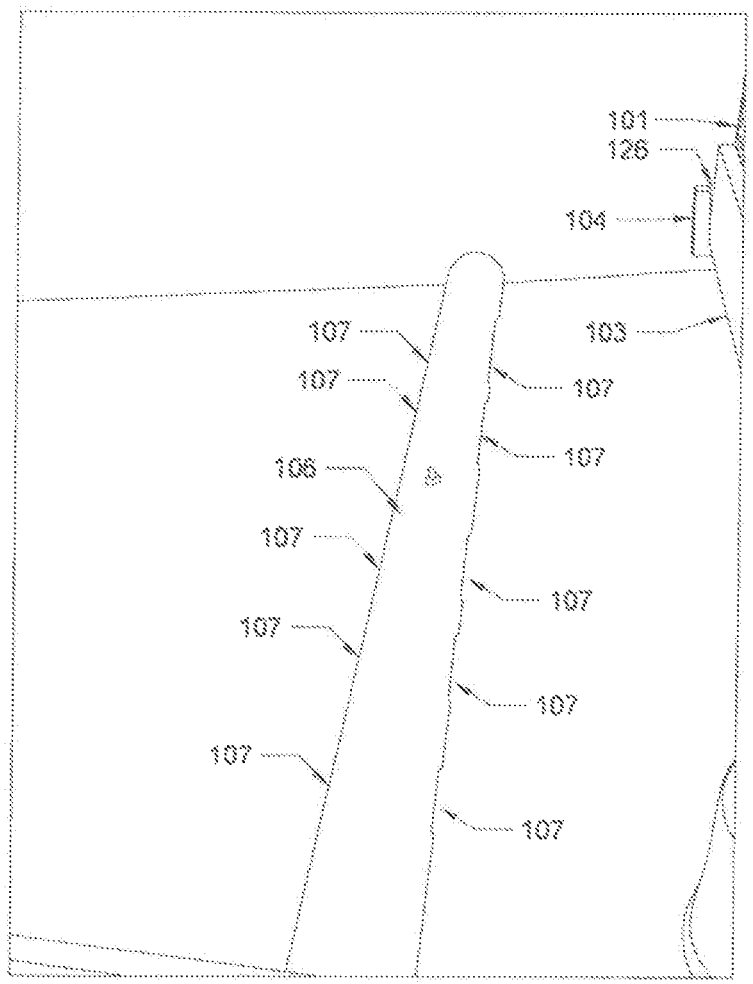
FIG. 8 is a schematic top perspective view illustrating the fluid channel device in a middle section of the bottom portion inside the cooling tower.

As shown in FIG. 8, fluid channel device 106 is located on the bottom portion 105 of the cooling tower 100 and is connected to the bottom portion 105 of the cooling tower 100 via fastener or fasteners 129. The fluid channel device 106 is positioned on the bottom portion 105 of the cooling tower 100 such that the opening 125 in the middle section of the bottom portion 105 of the cooling tower 100 is covered by the fluid channel device 106. Additionally, the fluid channel device 106 has a plurality of channels 107 spaced along the length of the fluid channel device 106. The channels 107 may have an elongated shape, a circular shape or any geometric or polygonal shape such that the collected fluid flows into the plurality of channels 107. The shape of the channels 107 is designed such that the height of the channels 107 allows the coldest lower level portion of the collected fluid to flow therethrough and is designed such that when the circulating pump 113 is operating at maximum power and flow rate, the collected fluid flows through the plurality of channels 107 at a flow rate such that the at least one indirect heat exchanger pad 101 is being maintained fully saturated (i.e. the outside surface of the indirect heat exchanger pads 101 are not devoid of a fluid) when the cooling tower 100 and system are operational. The height and/or shape of the channels 107 may all be same or some channels 107 may have the same shape and other channels 107 may have a different shape such that when the circulating pump(s) 113 is/are operating at maximum power and flow rate, the collected fluid flows through the plurality of channels 107 at a flow rate such that the at least one indirect heat exchanger pad 101 is/are being maintained fully saturated. Also, the height of the channels 107 may all be same or some channels 107 may have the same height and other channels 107 may have a different height such that when the circulating pump(s) 113 is/are operating at maximum power and flow rate, the collected fluid flows through the plurality of channels 107 at a flow rate such that the at least one indirect heat exchanger pad 101 is/are being maintained fully saturated. The height of the channels 107 is the maximum distance between the bottom portion 105 of the cooling tower 100 to the void of material in fluid channel device 106 which forms the channel 107.

As shown in FIG. 9, any ambient air inlet 116 can comprise louvers 117 and/or movable supports 118 such that the air inlet 116 can be moved using wheels 119 in order to perform maintenance.

All of the disclosed elements, devices and apparatus within the inside and/or inner surface of the cooling tower 100, except for the surfaces of the at least one indirect heat exchanger pad 101, are made from and/or coated with a non-porous material such as HDPE and not made from metal. Furthermore, insulation such as blown type of insulation is contained between the inner and outer walls which make up the cooling tower 100 in order to insulate any and all fluids within (i.e. inside) the cooling tower 100 from the sun's rays and hot fluids external of the cooling tower 100, which further increases the cooling efficiency of the cooling tower 100.

What is claimed is:

1. A cooling device comprising: a cooling tower attached to a swamp cooler,
wherein the cooling tower comprises a front side, a back side, which is opposite the front side,
a top side,
a bottom portion, which is opposite the top side, and at least one fan housing connecting the top side and the bottom portion to define an enclosure separated from the swamp cooler,
at least one indirect heat exchanger pad, and a circulating pump that circulates fluid from the bottom portion of the cooling tower to the at least one indirect heat exchanger pad via fluid passages, and
at least one air outlet, which is in fluid communication with an air inlet of the swamp cooler,
wherein all inside surfaces of the cooling tower, including the circulating pump and the fluid passages, except for surfaces of the at least one indirect heat exchanger pad, comprise high-density polyethylene (HDPE), and
the at least one indirect heat exchanger pad is located on a left side, a right side or both the left side and the right side of the cooling tower,
wherein the swamp cooler comprises at least one fan that pulls ambient air into the cooling tower and forces cooled air pulled through the at least one indirect heat exchanger pad into the at least one air outlet of the cooling tower, then through the at least one fan housing into the air inlet of the swamp cooler and then through an air outlet of the swamp cooler.

2. The cooling device according to claim 1, further comprising a distribution apparatus wherein the distribution apparatus is positioned above a top portion of the at least one indirect heat exchanger pad and a fluid line is fluidly connected to the distribution apparatus and pressurizes cooling fluid by a circulating pump.

3. The cooling device according to claim 2, wherein the distribution apparatus comprises a plurality of holes arranged in a staggered arrangement or random arrangement so as to evenly allow the cooling fluid to flow through the plurality of holes onto an outer surface of the at least one indirect heat exchanger pad.

4. The cooling device according to claim 1, wherein the at least one air outlet is formed on the left side or the right side of the cooling tower.

5. The cooling device according to claim 1, further comprising an ultrasonic sensor and a relay wherein the ultrasonic sensor and the relay are located above the bottom portion of the cooling tower, wherein the ultrasonic sensor and the relay are inserted within a protective container.

6. The cooling device according to claim 5, wherein the ultrasonic sensor and the relay sense and determine a collect fluid level within the bottom portion of the cooling tower and send signals to a fill valve or a chilled water valve.

7. The cooling device according to claim 1, wherein the front side, the back side, the top side, the bottom portion, the right side and the left side have a same temperature when being fastened together.

8. The cooling device according to claim 7, where the same temperature is in the range of 110° F. to 140° F.

9. The cooling device according to claim 1, further comprising a filter or grate wherein the filter or grate is attached to an outer surface of the cooling tower, wherein a distance between an inner surface of the filter or grate and a surface of the at least one indirect heat exchanger pad is in the range of four to six inches.

10. The cooling device according to claim 1, further comprising non-porous boards attached on front and back sides of the at least one indirect heat exchanger pad at both upper and lower ends of the at least one indirect heat exchanger pad.

11. The cooling device according to claim 10, wherein non-porous supports are attached to walls of the cooling tower such that the non-porous boards are supported by the non-porous supports.

12. The cooling device according to claim 11, wherein the non-porous supports have a groove and the non-porous boards are located within the grooves of the non-porous supports such that a space is formed between a bottom surface of the at least one indirect heat exchanger pad and the bottom portion of the cooling tower.

13. The cooling device according to claim 11, wherein the non-porous supports and the non-porous boards are made from or comprise high-density polyethylene.

14. The cooling device according to claim 10, wherein the non-porous boards are removably fastened to the at least one indirect heat exchanger pad.

15. The cooling device according to claim 1, further comprising a non-porous device attached to an inner wall of the cooling tower.

16. The cooling device according to claim 1, further comprising a protective container wherein the protective container is placed on the bottom portion of the cooling tower and has a flow passage which is located at a lower part of the protective container in order to allow collected fluid to flow into and out of the flow passage.

17. The cooling device according to claim 1, further comprising a fluid channel device located on the bottom portion of the cooling tower and connected to the bottom portion of the cooling tower with a fastener.

18. The cooling device according to claim 1, further comprising an opening in a middle section of the bottom portion of the cooling tower wherein the opening is covered by a fluid channel device and the fluid channel device has a plurality of channels spaced along a length of the fluid channel device.

19. The cooling device according to claim 1, wherein the air outlet of the swamp cooler is located in a bottom of the swamp cooler.

* * * * *